United States Patent
Kodama et al.

[11] Patent Number: 6,153,704
[45] Date of Patent: Nov. 28, 2000

[54] THERMOPLASTIC ELASTOMER COMPOSITION

[75] Inventors: Kazuhisa Kodama; Yoshihisa Mizuno; Hideo Nakanishi; Satoshi Yamashita; Kou Hasegawa; Kenji Yasuda, all of Tokyo, Japan

[73] Assignee: JSR Corporation, Tokyo, Japan

[21] Appl. No.: 09/233,050

[22] Filed: Jan. 19, 1999

[30] Foreign Application Priority Data

Jan. 20, 1998 [JP] Japan .................................. 10-022578

[51] Int. Cl.⁷ .............................. C08L 23/00; C08L 23/04
[52] U.S. Cl. ............................................................. 525/240
[58] Field of Search ............................................. 525/240

[56] References Cited

U.S. PATENT DOCUMENTS 5,756,575  5/1998  Kawasaki et al. ...................... 524/525

FOREIGN PATENT DOCUMENTS

| 0 452 089 | 10/1991 | European Pat. Off. . |
| 0 574 040 | 12/1993 | European Pat. Off. . |
| 0 577 255 | 1/1994  | European Pat. Off. . |
| 0 872 517 | 10/1998 | European Pat. Off. . |

OTHER PUBLICATIONS

Derwent WPI Acc No. 86–342453/198652, English Abstract of JP Patent No. 61255948, Nov. 13, 1986.
Derwent WPI Acc No. 88–080800/198812, English Abstract of JP Patent No. 63033451, Feb. 13, 1988.
Derwent WPI Acc No. 89–009800/198902, English Abstract of EP 298739, Oct. 19, 1994.

*Primary Examiner*—Nathan M. Nutter
*Attorney, Agent, or Firm*—Oblon, Spivak, McClelland, Maier & Neustadt, P.C.

[57] ABSTRACT

A thermoplastic elastomer composition prepared by dynamically treating with heat (a) an oil-extended ethylene-based copolymer rubber which comprises an ethylene-based copolymer rubber with an intrisic viscosity [η] in the range from 4.3 to 6.8 dl/g when measured at 135° C. in decalin and a mineral oil softening agent and (b) an olefin-based resin, in the presence of a crosslinking agent. The composition exhibits well-balanced and excellent elasticity recoverability and moldability, and can produce molded articles with superior appearance.

4 Claims, No Drawings

THERMOPLASTIC ELASTOMER COMPOSITION

BACKGROUND OF THE INVENTION

1. Field of the Invention

The present invention relates to a thermoplastic elastomer composition. More particularly, the present invention relates to a thermoplastic elastomer composition having well-balanced, excellent mechanical properties such as flexibility and elasticity recoverability and superior moldability, while producing molded products with superior appearance.

2. Description of Background Art

Since an olefin-based thermoplastic elastomer obtained by dynamically treating an ethylene-based copolymer rubber and an olefin-based resin with heat in the presence of a crosslinking agent does not require a valcanization treatment, such an elastomer can be molded by a molding method applied to common thermoplastic resins such as injection molding, profile extrusion molding, calender processing, blow molding, and the like. However, such an olefin-based thermoplastic elastomer has a drawback of inferior elasticity recoverability in comparison with vulcanized rubbers.

Conventionally, to make up for this drawback an increase in the cross-link density of ethylene-based copolymer rubber or promotion of Mooney of ethylene-based copolymer rubber has been adopted. Although the elasticity recoverability can be improved by these methods, the fluidity of the resulting thermoplastic elastomer composition is conspicuously impaired. The addition of an olefin-based rubber decomposable with a peroxide to improve moldability results in impaired elasticity recoverability. Fluidity of a thermoplastic elastomer composition can be improved by the addition of a large amount of mineral oil softening agent when the elastomer is dynamically treated with heat in the presence of a crosslinking agent. This method, however, impairs moldability and produces extrusion molded products with poor appearance.

It has thus been difficult to obtain a thermoplastic elastomer composition having well-balanced excellent elasticity recoverability and superior moldability, while producing molded products with superior appearance.

An object of the present invention is therefore to provide a thermoplastic elastomer composition having excellent mechanical properties such as flexibility and elasticity recoverability, while exhibiting excellent moldability, and capable of producing molded products with superior appearance.

As a result of extensive studies, the inventors of the present invention have found that the target thermoplastic elastomer composition can be obtained from (a) an oil-extended ethylene-based copolymer rubber comprising an ethylene-based copolymer rubber having a specific intrinsic viscosity [η] and a mineral oil softening agent and (b) an olefin-based resin by dynamically treating these materials with heat in the presence of a crosslinking agent.

SUMMARY OF THE INVENSION

Accordingly, an object of the present invention is to provide a thermoplastic elastomer composition prepared by dynamically treating a polymer composition comprising the following components (a) and (b) with heat in the presence of a crosslinking agent:

(a) an oil-extended ethylene-based copolymer rubber which comprises an ethylene-based copolymer rubber with an intrisic viscosity [η] in the range from 4.3 to 6.8 dl/g when measured at 135° C. in decalin and mineral oil softening agent and (b) an olefin-based resin, wherein the content of the components (a) and (b) in said polymer composition is at least 70 wt %.

In a preferred embodiment of the above thermoplastic elastomer composition, said oil-extended ethylene-based copolymer (a) comprises 100 parts by weight of the ethylene-based copolymer rubber and 20 to 300 parts by weight of the mineral oil softening agent.

In another preferred embodiment of the present invention, the above thermoplastic elastomer composition comprises said oil-extended ethylene-based copolymer (a) and said olefin-based resin (b) at a ratio by weight in the range from 20:80 to 95:5.

In still another preferred embodiment of the present invention, said oil-extended ethylene-based copolymer (a) is prepared by removing a solvent from a mixture of the ethylene-based copolymer rubber and the mineral oil softening agent.

Other objects, features and advantages of the invention will hereinafter become more readily apparent from the following description.

DETAILED DESCRIPTION OF THE INVENTION AND PREFERRED EMBODIMENTS

The oil-extended ethylene-based copolymer rubber which is the component (a) of the thermoplastic elastomer composition of the present invention comprises an ethylene-based copolymer rubber having an intrisic viscosity [η] in the range from 4.3 to 6.8 dl/g when measured at 135° C. in decalin and a mineral oil softening agent.

As the ethylene-based copolymer rubber, copolymers obtained by random copolymerization of ethylene, α-olefin having 3 or more, preferred 3–8, carbon atoms, and a non-conjugation diene can be given.

Propylene, 1-butene, 1-pentene, 1-hexene, 1-heptene, 1-octene, 1-decene, and the like are given as α-olefin having 3 or more carbon atoms which is copolymerized with ethylene. These α-olefins can be used either individually or in combinations of two or more.

As examples of the non-conjugation diene which is copolymerized, dicyclopentadiene, 1,4-hexadiene, cyclooctadiene, methylene norbornene, ethylidene norbornene, 5-methyl-1,4-hexadiene, 4-methyl-1,4-hexadiene, 6-methyl-1,5-heptadiene, methyl-1,6-octadiene, and the like can be given.

It is possible to provide the ethylene-based random copolymer with a branched structure according to a known method. As examples of preferable dienes to provide a branched structure, 1,5-hexadiene, 1,7-octadiene, 1,9-decadiene, norbornadiene, and the like can be given.

These non-conjugation dienes can be used either individually or in combinations of two or more.

To ensure adequate mechanical strength and flexibility of the ethylene-based random copolymer rubber, the molar ratio of ethylene and α-olefin in the ethylene-based random copolymer should be in the range from 50:50 to 95:5, preferably from 60:40 to 90:10. The content of non-conjugation diene is 12 wt % or less, preferably from 1 to 10 wt %.

The intrinsic viscosity of the ethylene-based copolymer rubber, measured in decalin at a temperature of 135° C., is in the range from 4.3 to 6.8 dl/g, preferably from 4.3 to 6.0 dl/g, more preferably from 4.4 to 5.7 dl/g. If the intrinsic viscosity is less than 4.3 dl/g, the elasticity recoverability are insufficient; if more than 6.8 dl/g, moldability is impaired.

The mineral oil softening agent used in the oil-extended ethylene-based copolymer rubber (a) not only provides the elastomer composition with excellent moldability and flexibility, but also provides the molded products with ecellent appearance. Aromatic, naphthenic, and paraffinic oils can be used as a mineral oil softening agent. Of these, paraffinic and naphthenic oils are desirable.

To ensure well-balanced superior moldability, flexibility, heat resistance, and mechanical strength of the thermoplastic elastomer composition of the present invention, the amount of the mineral oil softening agent incorporated is in the range from 20 to 300 parts by weight, preferably from 30 to 200 parts by weight, more preferably from 50 to 150 parts by weight, and ideally from 80 to 150 parts by weight, for 100 parts by weight of the ethylene-based copolymer rubber.

The oil-extended ethylene-based copolymer rubber (a) of the present invention can be prepared by removing a solvent from the mixture containing ethylene-based copolymer rubber and the mineral oil softening agent. Although there are no specific limitations to the method of preparing the oil-extended ethylene-based copolymer rubber (a), a preferable method comprises adding a specified amount of mineral oil softening agent to an ethylene-based copolymer rubber mixture which has been obtained by polymerization, blending the mixture, and removing the solvent by steam stripping, flashing, or the like.

It is possible to add a good solvent such as a hydrocarbon solvent (e.g. benzene, toluene, xylene, hexane, heptane, cyclohexane) or a halogenated hydrocarbon solvent (e.g. chlorobenzene) to the ethylene-based copolymer rubber obtained after the polymerization, to homogeneously dissolve the rubber in the solvent, then add a prescribed amount of mineral oil softening agent, followed by solvent removal by steam stripping, flashing, or the like.

Although it is possible to extend the ethylene-based copolymer rubber with an oil using equipment commonly used for the preparation of oil-extended rubbers such as a Banbury mixer, pressure kneading machine, or roller mill, homogeneous dispersion of the ethylene-based copolymer rubber in the mineral oil softening agent using such equipment is operationally difficult because of a large molecular weight of the rubber before extension with oil.

It is therefore desirable to add the mineral oil softening agent to a mixture of the ethylene-based copolymer rubber as described above. Since the softening agent is homogeneously dispersed in the rubber, bleeding out of the softening agent from the surface of molded articles can be prevented.

The ethylene-based copolymer rubber can be polymerized by a known polymerization method in the presence of a catalyst, such as a vanadium-type, titanium-type, or metallocene-type catalyst. It is desirable in practical application to use a low ratio of monomers to a polymerization solvent.

The ethylene-based copolymer rubbers can be used either individually or in combinations of two or more. Halogenated ethylene-based copolymer rubbers with part of hydrogen atoms in ethylene-based copolymer rubber replaced by halogen atoms such as chlorine or bromine atoms; or grafted ethylene-based copolymers modified with grafting unsaturated monomers such as vinyl chloride, vinyl acetate, (meth) acrylic acid or its derivatives (e.g. methyl (meth)acrylate, glycidyl (meth)acrylate, (meth)acrylamide), maleic acid or its derivatives (e.g. maleic anhydride, maleimide, dimethyl maleate), and conjugation dienes (e.g. butadiene, isoprene, chloroprene), can also be used.

The oil-extended ethylene-based copolymer rubber (a) may have any shape such as clam, bale, or pellet.

It is desirable that such oil-extended ethylene-based copolymer rubber (a) is non-crystalline or low crystalline from the viewpoint of improving flexibility and elasticity recoverability of the resulting composition. Because the crystallization degree relates to the density, it is possible to simply use the density as a measure for the crystallization degree. It is desirable that the oil-extended ethylene-based copolymer rubber (a) of the present invention have a density of 0.89 g/cm$^3$ or less.

The olefin-based resin of the component (b) will now be described in detail. Although there are no specific limitations, preferable olefin-based resins are ethylene homopolymer, crystalline ethylene copolymer with an ethylene content of 90 mol % or more, crystalline propylene homopolymer, and crystalline propylene copolymer with a propylene content of 90 mol % or more.

Specific examples are crystalline ethylene polymers such as high density polyethylene, low density polyethylene, ethylene/1-butene copolymer, ethylene/1-hexene copolymer, and ethylene/1-octene copolymer; crystalline propylene polymers in which the major component is propylene such as isotactic polypropylene, propylene/ethylene copolymer, propylene/1-butene copolymer, propylene/1-pentene copolymer, propylene/3-methyl-1-butene copolymer, propylene/1-hexene copolymer, propylene/3-methyl-1-pentene copolymer, propylene/4-methyl-l-pentene copolymer, propylene/3-ethyl-1-pentene copolymer, propylene/1-octene copolymer, propylene/1-decene copolymer, propylene/1-undecene copolymer, propylene/1-butene/ethylene ternary copolymer, propylene/1-hexene/1-octene ternary copolymer, and propylene/1-hexene/4-methyl-l-pentene ternary copolymer.

The weight ratio ((a)/(b)) of the oil-extended ethylene-based copolymer rubber (a) and the olefin-based resin (b) is usually from 20/80 to 95/5, preferably from 30/70 to 90/10, and even more preferably from 40/60 to 90/10. The thermoplastic elastomer composition of the present invention with well-balanced mechanical properties (such as flexibility and elasticity recoverability) and moldability, which can produce molded products with excellent appearance, can be ensured by blending the oil-extended ethylene-based copolymer rubber (a) and the olefin-based resin (b) at a ratio in the above range.

A crosslinking agent commonly used for cross-linking ethylene-based copolymer rubbers such as EPM and EPDM can be used as the crosslinking agent in the present invention. Included in such commonly used crosslinking agents are, for example, sulfur, sulfur compounds, organic peroxides, phenol resin-type crosslinking agents, quinoid-type crosslinking agents, metallic acrylate-type crosslinking agents, and bismaleimide-type crosslinking agents. These crosslinking agents will now be described in detail.

(1) Sulfur and sulfur compounds

As used in the present invention sulfur and sulfur compounds indicate those used for vulcanization. Such sulfur and sulfur compounds include commercially available sulfur products such as powdery sulfur, sublimed sulfur, precipitated sulfur, colloid sulfur, surface-treated sulfur, and insolubilized sulfur; sulfur compounds such as sulfur chloride, sulfur dichloride, morpholine disulfide, alkyl phenol disulfide, thioureas (e.g. dibutylthiourea), thiazoles (e.g.

mercaptobenzothiazole, dibenzothiazyldisulfide, 2-(4-morpholinodithio)benzothiazole), and dithiocarbamates (e.g. zinc diethyldithiocarbamate, zinc dimethyldithiocarbamate, and sodium dimethyldithiocarbamate).

(2) Organic peroxide

The following compounds can be given as examples of organic peroxides: dicumylperoxide, di-tert-butyl peroxide, 2,5-dimethyl-2,5-di(tert-butylperoxy)hexane, 2,5-dimethyl-di(tert-butylperoxy)hexyne-3, 1,3-bis(tert-butylperoxyisopropyl)benzene, 1,1-bis(tert-butylperoxy)-3, 3,5-trimethylcyclohexane, N-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butylperoxy isopropyl carbonate, diacetyl peroxide, lauroyl peroxide, tert-butyl peroxide, and the like.

Among these organic peroxides, preferred compounds are those which cause a mild decomposition reaction to proceed and effect a cross-linking reaction after the rubber and resin components have been homogeneously mixed. The properties of an organic peroxide which causes a mild decomposition reaction to proceed are indicated, for example, by way of a half-life temperature per minutes as an index. The organic peroxides having a sufficiently high (150° C. or higher) half-life temperature per minute are desirable.

Given as examples of such organic peroxides are 2,5-dimethyl-2,5-di(tert-butylperoxy)-hexyne-3,2,5-dimethyl-2, 5-di(tert-butylperoxy)hexane, 1,3-bis(tert-butylperoxyisopropyl)benzene, and the like. Of these, 2,5-dimethyl-2,5-di(tert-butylperoxy)-hexyne-3 with a high decomposition temperature is particularly preferred.

The use of a suitable cross-linking adjuvant together with the organic peroxide as a crosslinking agent can ensure a homogeneous and mild cross-linking reaction. Given as examples of such a cross-linking adjuvant are p-quinone dioxime, p,p'-dibenzoylquinone dioxime, ethylene glycol dimethacrylate, diethylene glycol dimethacrylate, triethylene glycol dimethacrylate, tetraethylene dimethacrylate, polyethylene glycol dimethacrylate, trimethylolpropane trimethacrylate, diaryl phalate, diaryl phthalate, tetraaryl oxyethane, triaryl cyanulate, diaryl phthalate, tetraaryl oxyethane, triaryl cyanulate, N,N-m-phenylene bismaleimide, maleic anhydride, divinylbenzene, zinc di(meth)acrylate, aluminum tri(meth)acrylate, and magnesiumdi(meth)acrylate. Of these cross-linking adjuvants, N,N-m-phenylenebismaleimide, p,p'-dibenzoylquinone dioxime, and divinylbenzene are preferable.

These cross-linking adjuvants may be used either individually or in combinations of two or more.

To ensure a homogeneous and mild cross-linking reaction, the organic peroxides are added in an amount preferably from 0.02 to 1.5 parts by weight, and more preferably from 0.05 to 1.0 parts by weight, for 100 parts by weight of the total amount of the ethylene-based copolymer rubber and polyolefin resin component.

The cross-linking adjuvant is added in an amount preferably 3 parts by weight or less, and more preferably from 0.2 to 2 parts by weight, for 100 parts by weight of the total amount of the ethylene-based copolymer rubber and polyolefin resin.

A thermoplastic elastomer composition with a uniform phase structure (sea-island structure), which ensures excellent moldability, can be obtained by adding the cross-linking agent and cross-linking adjuvant in these ranges. The addition of an excessive amount of these components should be avoided, because addition of an excessive amount may leave these components in the resulting thermoplastic elastomer composition as unreacted monomers, which may change properties of the composition due to heat history during molding process.

(3) Phenol resin-type crosslinking agent

Preferable phenol resin-type crosslinking agents are the compounds shown by the following formula.

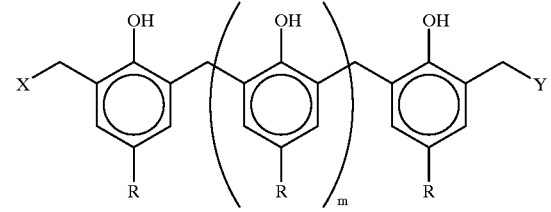

wherein m is an integer from 0 to 10, X and Y are individually a hydroxyl group or halogen atom, and R is a saturated hydrocarbon group having 1–15 carbon atoms.

These compounds are commonly used as crosslinking agents for rubbers as described in U.S. Pat. No. 3,287,440 and U.S. Pat. No. 3,709,840. These crosslinking agents can be prepared by condensation-polymerization of a substituted phenol and an aldehyde in the presence of an alkali catalyst.

To ensure a suitable cross-linking degree, oil resistance, properties of shape recovery, and flexibility of the thermoplastic elastomer composition of the present invention, these phenol resin-type crosslinking agents should be added in an amount preferably from 0.1 to 10 parts by weight, and more preferably from 0.3 to 5 parts by weight, and even more preferably from 0.4 to 2 parts by weight, for 100 parts by weight of the total amount of ethylene-based copolymer rubber and olefin-based resin.

Although the phenol resin-type crosslinking agents may be used alone, they may be used in combination with a cross-linking accelerator to adjust the crosslinking rate. As the cross-linking accelerators, a metal halide such as stannous chloride or ferric chloride, an organic halide such as chlorinated polypropylene, brominated polypropylene, brominated butyl rubber, or chloroprene rubber, and the like can be given. Moreover, a desirable result can be obtained by the combined use of a dispersing agent such as a metal oxide (e.g. zinc oxide) and stearic acid.

(4) Quinoid-type crosslinking agent

As preferable quinoide-type crosslinking agent, derivatives of p-quinone dioxime can be given. Specifically, such derivatives include p-benzoquinone dioxime, p-dibenzoylquinone diamide, and the like.

From the same reasons as in the case of the phenol resin-type crosslinking agent, the amount of the quinoid-type crosslinking agent used is in the range preferably from 0.2 to 10 parts by weight, more preferably from 0.5 to 7 parts by weight, and even more preferably from 0.8 to 3 parts by weight, for 100 parts by weight of the total amount of ethylene-based copolymer rubber and olefin-based resin.

Although the phenol resin-type crosslinking agents may be used alone, they may be used in combination with a cross-linking accelerator to adjust the crosslinking rate. As the cross-linking accelerators, oxidizing agents such as red lead, dibenzothiazoyl sulfide, and tetrachlorobenzoquinone can be used. Moreover, a desirable result can be obtained by the combined use of a dispersing agent such as a metal oxide (e.g. zinc oxide) and stearic acid.

(5) Metal acrylate-type crosslinking agent The metal acrylate-type crosslinking agents are salts of a metal (such as zinc or calcium) of acrylic acid or methacrylic acid. These are usually obtained by the reaction of zinc oxide or zinc carbonate and acrylic acid or methacrylic acid. Specific compounds include zinc dimethacrylate, calcium dimethacrylate, magnesium dimethacrylate, monohydroxy aluminum dimethacrylate, aluminum trimethacrylate, calcium diacrylate, magnesium diacrylate, monohydroxy aluminum diacrylate, aluminum triacrylate, and the like. The amount of metal acrylate-type crosslinking agent used to dynamically treating the components of the present invention with heat is in the range preferably from 1 to 20 parts by weight, and more preferably from 4 to 12 parts by weight, for 100 parts by weight of the total amount of ethylene-based copolymer rubber and olefin-based resin.

(6) Bismaleimide-type crosslinking agent

The compound which is usually used as a bismaleimide-type crosslinking agent is N,N'-m-phenylene bismaleimide. Although the bismaleimide-type crosslinking agent is used as a cross-linking adjuvant in combination with an organic peroxide cross-linking agent, individual use of the bismaleimide-type compound is also known to effect the cross-linking reaction.

The amount of the bismaleimide-type crosslinking agent added is in the range preferably from 0.05 to 10 parts by weight, more preferably from 0.1 to 5 parts by weight, and even more preferably from 0.2 to 2parts by weight, for 100 parts by weight of the total amount of the ethylene-based copolymer rubber and olefin-based resin.

In addition to the above-described components, various additives may be added to the thermoplastic elastomer composition of the present invention inasmuch as the characteristics of the composition is not adversely affected. Included in such additives are antioxidants, antistatic agents, weather stabilizers, UV absorbers, lubricants, blocking preventives, seal improvers, crystal nucleus agents, flame retardants, antiseptics, fungicides, tackifiers, softening agents, plasticizers, coloring agents (e.g. titanium oxide, carbon black), and fillers (e.g. glass fiber, carbon fiber, metal fiber, alamide fiber, glass beads, mica, calcium carbonate, potassium titanate whiskers, talc, barium sulfate, glass flakes, fluoro resins). Furthermore, polymers such as rubber polymers (e.g. isobutylene-isoprene rubber, butadiene-acrylonitrile rubber), thermoplastic resins, thermoplastic elastomers (e.g. low crystalline propylene-based polymer, hydrogenated diene polymer), and the like may optionally be added. These polymers may be added either while the components (a) and (b) are dynamically treated with heat in the presence of a cross-linking agent or after completion of the dynamic heat-treatment. The amount of these polymers other than the components (a) and (b) is less than 30 wt % for 100 wt % of the total polymer components in the composition.

In addition, to the extent that the above-mentioned mineral oil softening agent may not bleed out, this softening agent may be added while the thermoplastic elastomer composition is dynamically treated with heat.

The thermoplastic elastomer composition of the present invention is obtained dynamically treating the above-mentioned (a) oil-extended ethylene-based copolymer rubber and (b) polyolefin resin with heat in the presence of a crosslinking agent.

The term "dynamically treating with heat" in the present invention means a treatment effecting melt-kneading and dispersion of the components (a) and (b) and, at the same time, effecting the cross-linking reaction of the component (a) in the presence of a crosslinking agent. This treatment produces an olefin-based thermoplastic elastomer composition having an sea-island-like structure comprising partially or completely cross-linked component (a) dispersed in the matrix of the component (b).

A desirable temperature condition for the dynamic heat-treatment to effect well-balanced melting and cross-linking reaction of the component (b) is from 150° C. to 250° C.

Equipment used for the dynamic heat-treatment is selected from batch type kneading machines, such as a pressure kneader, Banbury mixer, monoaxial extruder, or biaxial extruder, and continuous type kneading machines, such as a continuous kneader, feederuder, or the like, and combinations of these.

The thermoplastic elastomer composition of the present invention can be obtained using the equipment and the process described in ① to ② below, by way of example.

① A process comprising kneading the components (a) and (b) using a batch type kneading machine, heating the mixture to a temperature high enough to melt the components (a) and (b), and then adding the crosslinking agent to effect a dynamic heat treatment.

② A process comprising a first step of sufficiently blending the components (a) and (b) using a batch type kneading machine at a temperature high enough to melt the components (a) and (b), and a second step of adding the crosslinking agent to the blend obtained in the first step and dynamically treating the blend with heat.

③ A process comprising feeding the component (a), the component (b), and the crosslinking agent to a continuous type kneading machine and dynamically treating the mixture with heat.

The additional mineral oil softening agent and various additives may be added in any optional steps of the above processes.

These processes ①, ②, and ③ are given as preferred embodiments, and the processes are not limited to these as long as the objective of the present invention of dynamically treating the components (a) and (b) with heat in the presence of a crosslinking agent is achieved.

The present invention will be explained in more detail by way of examples, which are not intended to be limiting of the present invention.

EXAMPLES

In the examples hereinafter unless otherwise designated, "parts" and "%" respectively indicate "parts by weight" and "% by weight".

Various properties in the examples were measured according to the following methods.

(1) JIS A Hardness

The hardness was measured according to JIS K6301.

(2) Elasticity recoverability

The compression set measured on samples compressed 25% at 70° C. for 22 hours was used as an index for the elasticity recoverability. The smaller the compression set, the larger is the elasticity recoverability.

(3) Tensile strength and maximum elongation

JIS K6301 was followed.

(4) Fluidity

The melt flow rate measured under the following conditions was adopted as a standard for fluidity.

Temperature: 230° C.; Load: 10 kg (5) Moldability

Moldability was evaluated by extrusion molding and injection molding.

① Injection molding:

A flat plate was molded by injection molding using a 6.5 ounce injection molding machine manufactured by The Japan Steel Works, Ltd.

Indentation, burning, and mold transfer performance were evaluated and rated according to the following standard.

◯: There were no indentation and burning, and the mold specular surface was transferred sufficiently.

Δ: Any one of slight indentation, burning, and inadequate mold transfer occurred.

X: Any one of significant indentation, burning, and inadequate mold transfer occurred.

② Extrusion molding:

A sheet was molded by a 30 mm extruder equipped with a T-die, manufactured by Nakatani Machinery Co., Ltd. The surface of the sheet was evaluated and rated according to the following standard.

○: Surface was sufficiently smooth.

Δ: The surface was slightly rough or a shark skin was produced.

X: A melt fracture was produced.

The following components were used in the Examples and Comparative Examples.

(1) Oil-extended ethylene-based copolymer rubber

Ethylene-propylene-diene random copolymer rubbers and mineral oil softening agents used, and the oil-extension amount are shown in the following Table 1.

TABLE 1

|  | EP-1 | EP-2 | EP-3 | EP-4 | EP-5 | EP-6 | EP-7 |
|---|---|---|---|---|---|---|---|
| [η] (dl/g) | 4.9 | 4.7 | 5.3 | 4.9 | 4.5 | 3.8 | 4.5 |
| Propylene content (wt %) | 30 | 27 | 29 | 30 | 27 | 27 | 27 |
| Diene* | ENB | ENB | ENB | DCP | ENB | ENB | ENB |
| Diene content (wt %) | 4.5 | 4.5 | 4.5 | 5.5 | 4.5 | 4.5 | 4.5 |
| Oil-extension amount** | 96 | 100 | 120 | 96 | 75 | 75 | 0 |
| Mineral oil softening agents | Oil-1 | Oil-2 | Oil-1 | Oil-1 | Oil-1 | Oil-1 | — |

*Diene
ENB: Ethylidene norbornene
DCP: Dicyclopentadiene
**The amount of oil for 100 parts by weight of rubber.

The oil-extended ethylene-propylene-diene random copolymer rubber (EP-1 to EP-6) in Table 1 were prepared by the following method.

A 3 liter separable flask of which the internal atmosphere was previously replaced by nitrogen was charged with 2 liter n-hexane. Ethylene gas, propylene gas, and hydrogen gas purified by passing through molecular sieve were fed at a ratio of 6/4/1 by volume and dissolved for 10 minutes while stirring at room temperature.

Next, diene components, 5 mmol of aluminum sesquichloride ($AlEt_{1.5}Cl_{1.5}$), and 0.1 mmol of vanadium oxytrichloride ($VOCl_3$) were added to initiate the polymerization reaction. The reaction was continued by feeding ethylene gas, propylene gas, and hydrogen gas while controlling the temperature at 20° C. After 20 minutes, the catalyst was deactivated by feeding isopropyl alcohol purified by molecular sieve, thereby terminating the polymerization reaction. A prescribed amount of mineral oil softening agent was blended with the resulting copolymer solution. The mixture was added to methanol to obtain a precipitate, which was dried using a heat roller mill at 100° C. to obtain an oil-extended copolymer rubber.

(2) Polyolefin resin

PP-1: Polypropylene (MA-03, manufactured by Japan Polychem Co., Ltd.)

PP-2: Random Polypropylene (MG-03A, manufactured by Japan Polychem Co., Ltd.)

PP-3: Block Polypropylene (BC-03C, manufactured by Japan Polychem Co., Ltd.)

PP-4: Random Polypropylene (EX-6, manufactured by Japan Polychem Co., Ltd.)

PE: Linear low density polyethylene (UJ370, manufactured by Japan Polychem Co., Ltd.)

(3) Mineral oil softening agent

Oil-1: Paraffin oil (PW-380, manufactured by Idemitsu Kosan Co., Ltd.)

Oil-2: Naphthene oil (NS-100, manufactured by Idemitsu Kosan Co., Ltd.)

(4) Crosslinking agent

Crosslinking agent 1: 2,5-dimethyl-2,5-di(tert-butyl peroxy)-hexyne-3 (PERHEXYNE 25B, manufactured by Nippon Oil and Fats Co., Ltd.)

Crosslinking agent 2: N,N-m-phenylenebismaleimide (Vulnoc PM, manufactured by Ouchi Shinko Chemical Co., Ltd.)

Crosslinking agent 3: Alkylphenol formaldehyde (Tackyrole 201, manufactured by Taoka Chemical Co., Crosslinking agent 4: Brominated alkylphenol formaldehyde (Tackyrole 250, manufactured by Taoka Chemical Co., Crosslinking agent 5: p-Benzoquinonedioxime (Actor Q, manufactured by Kawaguchi Chemical Co., Ltd.)

Crosslinking agent 6: Tetrachlorobenzoquinone (Acor CL, manufactured by Kawaguchi Chemical Co., Ltd.)

Crosslinking agent 7: Zinc dimethacrylate (manufactured by Asada Chemical Co., Ltd.)

(5) Additives

Additive 1: Divinylbenzene (manufactured by Sankyo Chemical Co., Ltd.)

Additive 2: Chlorinated polyethylene (Elaslen 301A, manufactured by Showa Denko Co., Ltd.)

Additive 3: No.1 zinc white (Type 2 zinc white, manufactured by Hakusui Chemical Co., Ltd.)

Additive 4: Stearic acid (Lunac S30, manufactured by KAO Corp.)

(6) Other polymers (i) Hydrogenated diene copolymers

Hydrogenated butadiene-styrene rubber: Dynaron 1320P, manufactured by JSR Corp.)

CEBC: (Dynaron 6200P, manufactured by JSR Corp.)

SEBS: (Krayton G 1657, manufactured by Shell Chemical Co., Ltd.)

SEPS: (SEPTON 2007, manufactured by Kuraray Co., Ltd.)

(ii) Low crystalline α-olefin polymer

APAO: (Ubetack APAO 2528, manufactured by Ube Rexene Co., Ltd.

Examples 1–25, Comparative Examples 1–10

Compositions were prepared from the components shown in Tables 2–6 according to the following method.

Specifically, the polymers, softening agents, and the like were melt-kneaded in a pressurized kneader (volume: 10 l, manufactured by Moriyama Manufacturing Co., Ltd.) at an internal temperature of 180° C. The composition discharged from the kneader was continuously extruded from a feederuder and cut into master batch pellets.

The master batch pellets and crosslinking agents were dynamically treated with heat by continuously extruding from a biaxial extruder (PCM-45, manufactured by Ikegai Co., Ltd.), thereby obtaining a thermoplastic elastomer composition.

To obtain the samples, sheets with a thickness of 2 mm were prepared from the resulting thermoplastic elastomer compositions for Examples and Comparative Examples other than Example 4 using a 6.5 ounce injection molding machine. For the composition of Example 4, sheets with a thickness of 2 mm were prepared using a 6 inch electric heat roller mill (temperature: 180° C.), followed by electric heat press.

Samples for the evaluation of JIS A hardness and the compression set were prepared by punching out test pieces from a sheet with a thickness of 2 mm fabricated using the above-mentioned injection molding machine or a press molding machine, and piling the punched-out pieces to a prescribed size. For the evaluation of tensile strength and maximum elongation, test specimens were punched out from the sheets using a dumbbell cutter. Results are shown in Tables 2–6.

TABLE 2

| Examples | 1 | 2 | 3 | 4 | 5 | 6 | 7 | 8 | 9 | 10 | 11 |
|---|---|---|---|---|---|---|---|---|---|---|---|
| Ethylene-based copolymer rubbers | | | | | | | | | | | |
| EP-1 | 80 | 80 | 80 | 80 | | | | | 50 | 70 | 90 |
| EP-2 | | | | | 80 | | | | | | |
| EP-3 | | | | | | 80 | | | | | |
| EP-4 | | | | | | | 80 | | | | |
| EP-5 | | | | | | | | 80 | | | |
| Polyolefin resin | | | | | | | | | | | |
| PP-1 | | 20 | | | | | | 20 | | | |
| PP-2 | 20 | | | | 20 | 20 | 20 | | 50 | 30 | 10 |
| PP-3 | | | 20 | | | | | | | | |
| PP-4 | | | | 20 | | | | | | | |
| Crosslinking agent | | | | | | | | | | | |
| Crosslinking agent 1 | 0.4 | 0.4 | 0.4 | 0.4 | 0.4 | 0.4 | 0.4 | 0.4 | 0.4 | 0.4 | 0.4 |
| Crosslinking agent 2 | 1 | 1 | 1 | 1 | 1 | 1 | 1 | 1 | 1 | 1 | 1 |
| Properties | | | | | | | | | | | |
| JIS-A Hardness | 69 | 72 | 69 | 69 | 68 | 70 | 71 | 72 | 96 | 81 | 58 |
| Compression set (%) | 25 | 24 | 25 | 23 | 26 | 21 | 23 | 25 | 41 | 29 | 20 |
| Tensile strength (kg/cm$^2$) | 69 | 72 | 66 | 73 | 64 | 78 | 72 | 70 | 98 | 81 | 54 |
| Maximum elongation (%) | 540 | 520 | 550 | 580 | 560 | 650 | 560 | 580 | 320 | 490 | 720 |
| Fluidity | 78 | 75 | 74 | 31 | 83 | 80 | 71 | 70 | 100 | 85 | 51 |
| Injection moldability | ○ | ○ | ○ | | ○ | ○ | ○ | ○ | ○ | ○ | ○ |
| Extrusion moldability | | | | ○ | | | | | | | |

TABLE 3

| Examples | 12 | 13 | 14 | 15 | 16 | 17 | 18 | 19 |
|---|---|---|---|---|---|---|---|---|
| Ethylene-based copolymer rubber | | | | | | | | |
| EP-1 | 80 | 80 | 80 | 80 | 80 | 80 | 80 | 80 |
| Polyolefin resin | | | | | | | | |
| PP-1 | 20 | 20 | 20 | 20 | 20 | 20 | 20 | |
| PE | | | | | | | | 20 |
| Crosslinking agent | | | | | | | | |
| Crosslinking agent 1 | 0.4 | 0.4 | 0.4 | | | | | |
| Crosslinking agent 3 | | | | 1 | | | | |
| Crosslinking agent 4 | | | | | 1 | | | 1 |
| Crosslinking agent 5 | | 1 | | | | 1 | | |
| Crosslinking agent 6 | | | | | | 0.5 | | |
| Crosslinking agent 7 | | | 1 | | | | 10 | |
| Additives | | | | | | | | |
| Additive 1 | 1 | | | | | | | |
| Additive 2 | | | | 0.5 | | | | |
| Additive 3 | | | | 1.2 | 1.2 | 1.2 | 1.2 | 1.2 |
| Additive 4 | | | | 0.3 | 0.3 | 0.3 | 0.3 | 0.3 |

TABLE 3-continued

| Examples | 12 | 13 | 14 | 15 | 16 | 17 | 18 | 19 |
|---|---|---|---|---|---|---|---|---|
| Properties | | | | | | | | |
| JIS-A Hardness | 69 | 71 | 70 | 71 | 71 | 71 | 72 | 61 |
| Compression set (%) | 23 | 22 | 24 | 19 | 20 | 24 | 28 | 18 |
| Tensile strength (kg/cm$^2$) | 70 | 73 | 85 | 91 | 90 | 85 | 98 | 74 |
| Maximum elongation (%) | 530 | 490 | 510 | 540 | 520 | 540 | 530 | 390 |
| Fluidity | 51 | 48 | 52 | 21 | 25 | 35 | 46 | 38 |
| Injection moldability | ○ | ○ | ○ | ○ | ○ | ○ | ○ | ○ |
| Extrusion moldability | | | | | | | | |

TABLE 4

| Examples | 20 | 21 | 22 | 23 | 24 | 25 |
|---|---|---|---|---|---|---|
| Ethylene-based copolymer rubber | | | | | | |
| EP-1 | 80 | 80 | 80 | 80 | 80 | 80 |
| Polyolefin resin | | | | | | |
| PP-2 | 20 | 20 | 20 | 20 | 20 | 20 |
| Crosslinking agent | | | | | | |
| Crosslinking agent 1 | 0.4 | 0.4 | 0.4 | 0.4 | 0.4 | 0.4 |
| Crosslinking agent 2 | 1 | 1 | 1 | 1 | 1 | 1 |

TABLE 4-continued

| Examples | 20 | 21 | 22 | 23 | 24 | 25 |
|---|---|---|---|---|---|---|
| Other polymers | | | | | | |
| Hydrogenated SBR | 20 | | | | | |
| CEBC | | 20 | | | | |
| SEBS | | | 20 | | | |
| SEPS | | | | 20 | | |
| APAO | | | | | 10 | |
| Mineral oil softening agent | | | | | | |
| Oil-1 | | | | | | 20 |
| Properties | | | | | | |
| JIS-A Hardness | 60 | 71 | 65 | 64 | 50 | 60 |
| Compression set (%) | 27 | 22 | 24 | 26 | 21 | 24 |
| Tensile strength (kg/cm²) | 61 | 78 | 72 | 71 | 54 | 58 |
| Maximum elongation (%) | 720 | 620 | 710 | 680 | 710 | 620 |
| Fluidity | 81 | 78 | 79 | 82 | 150 | 84 |
| Injection moldability | ○ | ○ | ○ | ○ | ○ | ○ |
| Extrusion moldability | | | | | | |

TABLE 5

| Comparative Example | 1 | 2 | 3 | 4 |
|---|---|---|---|---|
| Ethylene-based copolymer rubber | | | | |
| EP-6 | 80 | 80 | | |
| EP-7 | | | 46 | 40 |
| Polyolefin resin | | | | |
| PP-1 | | | 20 | 20 |
| PP-2 | 20 | 20 | | |
| Crosslinking agent | | | | |
| Crosslinking agent 1 | 0.4 | | 0.4 | |
| Crosslinking agent 2 | 1 | | 1 | |
| Crosslinking agent 4 | | 1 | | 1 |
| Additives | | | | |
| Additive 3 | | 1.2 | | 1.2 |
| Additive 4 | | 0.3 | | 0.3 |
| Mineral oil softening agent | | | | |
| Oil-1 | | | 34 | 40 |
| Properties | | | | |
| JIS-A Hardness | 69 | 70 | 70 | 68 |
| Compression set (%) | 38 | 24 | 45 | 31 |
| Tensile strength (kg/cm²) | 51 | 90 | 60 | 72 |
| Maximum elongation (%) | 500 | 490 | 500 | 300 |
| Fluidity | 64 | 18 | 90 | 50 |
| Injection moldability | ○ | ○ | ○ | ○ |
| Extrusion moldability | | | | |

TABLE 6

| Comparative Example | 5 | 6 | 7 | 8 | 9 | 10 |
|---|---|---|---|---|---|---|
| Ethylene-based copolymer rubber | | | | | | |
| EP-6 | 50 | 70 | 90 | 80 | | 80 |
| EP-7 | | | | | 40 | |
| Polyolefin resin | | | | | | |
| PP-2 | 50 | 30 | 10 | | | |
| PP-4 | | | | 20 | 20 | |
| PE | | | | | | 20 |
| Crosslinking agent | | | | | | |
| Crosslinking agent 1 | 0.4 | 0.4 | 0.4 | 0.4 | 0.4 | |
| Crosslinking agent 2 | 1 | 1 | 1 | 1 | 1 | |
| Crosslinking agent 4 | | | | | | 1 |
| Additives | | | | | | |
| Additive 3 | | | | | | 1.2 |
| Additive 4 | | | | | | 0.3 |
| Mineral oil softening agent | | | | | | |
| Oil-1 | | | | | 40 | |
| Properties | | | | | | |
| JIS-A Hardness | 96 | 80 | 59 | 69 | 66 | 65 |
| Compression set (%) | 60 | 41 | 34 | 35 | 41 | 25 |
| Tensile strength (kg/cm²) | 83 | 66 | 30 | 61 | 52 | 50 |
| Maximum elongation (%) | 250 | 330 | 520 | 440 | 380 | 200 |
| Fluidity | 78 | 58 | 20 | 18 | 40 | 32 |
| Injection moldability | ○ | ○ | Δ | | | ○ |
| Extrusion moldability | | | | Δ | Δ | |

Examples 1–8 show the compositions using various ethylene-based copolymer rubbers conforming to the present invention and various propylene resins for the polyolefin resin. Of these, the composition of Example 4 was prepared particularly for profile extrusion. Comparison of these compositions with the compositions of Comparative Examples 1, 3, 8, and 9 (the compositions of Comparative Examples 1 and 3 were designed for injection molding and the compositions of Comparative Example 8 and 9 for profile extrusion) using ethylene-based copolymer rubbers outside the scope of the present invention and propylene resins indicates that the compositions of the Examples within the scope of the present invention are excellent in both compression set and tensile strength.

The compositions of Examples 1, 9–11 were prepared to have different hardness using an ethylene-based copolymer rubber within the scope of the present invention. Comparison of these compositions with the compositions of Comparative Examples 1, 5–7, having corresponding hardness, but made from ethylene-based copolymer rubbers outside the scope of the present invention, indicates that the thermoplastic elastomer compositions within the scope of the present invention exhibits superior compression set, tensile strength, and moldability to the compositions of the Comparative Examples.

The compositions of Examples 12–14, 17, and 18 prepared using the same polymers as in Example 2 and adding various crosslinking agents for partial cross-linking within the scope of the present invention exhibited excellent elasticity recoverability, mechanical strength, moldability with the same degree as in the thermoplastic elastomer composition of Example 2, although there are some differences due to the use of different crosslinking agents.

The compositions of Examples 15, 16, and 19 were prepared using an ethylene-based copolymer rubber within the scope of the present invention and a complete crosslinking-type crosslinking agent. Of these, the compositions of Examples 15 and 16 use a polypropylene resin for the polyolefin resin and the composition of Example 19 uses a polyethylene resin for the polyolefin resin. Comparison of these comparisons with the compositions of Comparative Example 2, 4, and 10 using ethylene-based copolymer rubbers outside the scope of the present invention (Comparative Example 2 and 4 use a polypropylene resin and Comparative Example 10 uses a polyethylene resin) indicates that the thermoplastic elastomer compositions within the scope of the present invention excels in both elasticity recoverability and mechanical strength.

Examples 20–25 show the compositions with the same polymer composition as the composition of Example 1, except that the compositions which additionally contain other polymers and mineral oil softening agents were dynamically treated with heat. These compositions also exhibit the same excellent elasticity recoverability, mechanical strength, and moldability as the composition of Example 1.

Based on these comparisons, the thermoplastic elastomer composition of the present invention was confirmed to exhibit well-balanced superior elasticity recoverability, and mechanical strength, and moldability, while producing molded products with excellent appearance. Among the components used in Comparative Examples, EP-6 is an ethylene-based copolymer having an intrinsic viscosity [η] lower than the value defined for the present invention. The composition of Comparative Example 1 corresponds to the composition of Example 1 but for the use of EP-6 instead of EP1. Because of a low intrinsic viscosity [η] of the ethylene-based copolymer rubber (EP-6) used, this composition exhibited inferior compression set, tensile strength, and maximum elongation. EP-7 is an ethylene-based copolymer rubber not extended with a mineral oil. The compositions of Comparative Examples 3, 4, and 9 which approximately correspond to the compositions of Examples 8, 16, and 4, respectively, contain the EP-7 as an ethylene-based copolymer rubber. It was confirmed that these compositions exhibited only poor compression set, tensile strength, and maximum elongation, even though a mineral oil softening agent was added during the dynamic cross-linking treatment.

A thermoplastic elastomer composition with well-balanced and excellent elasticity recoverability and moldability is provided according to the present invention. In addition, molded articles with superior appearance can be prepared from the thermoplastic elastomer composition using the same equipment as used for molding conventional thermoplastic resins.

The thermoplastic elastomer composition of the present invention therefore can be suitably used for the fabrication of internal and external parts for automobiles, electronic parts such as packing and housing, industrial parts, waterproof sheets, gasket seals, and the like, for which soft polyvinyl chloride resins and vulcanized rubbers have conventionally been used.

Obviously, numerous modifications and variations of the present invention are possible in light of the above teachings. It is therefore to be understood that, within the scope of the appended claims, the invention may be practiced otherwise than as specifically described herein.

What is claimed is:

1. A thermoplastic elastomer composition prepared by dynamically treating a polymer composition comprising the following components (a) and (b) with heat in the presence of a crosslinking agent:

(a) an oil-extended ethylene-based copolymer rubber which comprises an ethylene-based copolymer rubber with an intrisic viscosity [η] in the range from 4.3 to 6.8 dl/g when measured at 135° C. in decalin and a mineral oil softening agent and (b) an olefin-based resin, wherein the content of the components (a) and (b) in said polymer composition is at least 70 wt %.

2. The thermoplastic elastomer composition according to claim 1, wherein said oil-extended ethylene-based copolymer (a) comprises 100 parts by weight of the ethylene-based copolymer rubber and 20 to 300 parts by weight of the mineral oil softening agent.

3. The thermoplastic elastomer composition according to claim 1, comprising said oil-extended ethylene-based copolymer (a) and said olefin-based resin (b) at a ratio by weight in the range from 20:80 to 95:5.

4. The thermoplastic elastomer composition according to claim 1, wherein said oil-extended ethylene-based copolymer (a) is prepared by removing a solvent from a mixture of the oil-extended ethylene-based copolymer rubber and the mineral oil softening agent.

* * * * *